United States Patent [19]

Ocvirk et al.

[11] Patent Number: 5,013,096
[45] Date of Patent: May 7, 1991

[54] ANTI-LOCK BRAKE SYSTEM WITH TRACTION SLIP CONTROL

[75] Inventors: Norbert Ocvirk, Offenbach; Lutz Weise, Mainz, both of Fed. Rep. of Germany

[73] Assignee: Alfred Teves GmbH, Frankfurt am Main, Fed. Rep. of Germany

[21] Appl. No.: 423,067

[22] Filed: Oct. 18, 1989

[30] Foreign Application Priority Data

Nov. 3, 1988 [DE] Fed. Rep. of Germany ....... 3837315

[51] Int. Cl.$^5$ .............................................. B60T 13/68
[52] U.S. Cl. ..................................... 303/116; 303/113
[58] Field of Search ................ 303/105, 110, 113, 116

[56] References Cited

U.S. PATENT DOCUMENTS

| | | | |
|---|---|---|---|
| 4,826,258 | 5/1989 | Ocvirk et al. | 303/113 X |
| 4,856,852 | 8/1989 | Ocvirk et al. | 303/116 X |
| 4,900,105 | 2/1990 | Burgdorf et al. | 303/116 |

FOREIGN PATENT DOCUMENTS

| | | |
|---|---|---|
| 2153025 | 8/1985 | United Kingdom . |
| 2196401 | 4/1988 | United Kingdom . |

Primary Examiner—George E. A. Halvosa
Assistant Examiner—Alfred Muratori
Attorney, Agent, or Firm—Robert P. Seitter; J. Gordon Lewis

[57] ABSTRACT

An anti-lock brake system with traction slip control comprising a pedal-actuated, auxiliary-force-assisted braking pressure generator (1) having a master cylinder (2), to which the wheel brakes (31, 32, 33, 34) are connected by way of main brake lines (62, 63) of auxiliary-pressure hydraulic pumps (21, 26), and of wheel sensors (S1, S2, S3, S4) and electronic circuits (28) for determining the wheel rotational behavior and for generating electric braking-pressure control signals. For the purpose of brake slip control, the signals control electromagnetically actuatable pressure-fluid inlet valves (24, 25, 29, 30) and outlet valves (22, 23, 35, 36) inserted into the pressure-fluid lines. The pistons (6, 7) of the master cylinder (2) are furnished with central control valves (10, 11) and the brake lines (62, 63) communicate with the motively driven pumps (21, 26) by way of supply lines (45, 46) in which non-return valves (38, 39) are arranged. A valve (87) is inserted into the one supply lines (45), through which pressure fluid is delivered into the brake circuits (62, 63) for the purpose of traction slip control. The portion of the supply line (45) interconnecting the pumps (21, 26) and the valve (87) communicates by way of a bypass line (95) with the main brake lines (62). Each pressure-relief valve (82) is interposed into the bypass lines (95) which permits the delivery of pressure fluid into the main brake lines (62) after a nominal pressure is exceeded, but which precludes pressure fluid flow in opposite direction. A pressure-fluid accumulator (76) is in communication with the bypass line (95) into which fluid is supplied by the pump (21) until attainment of the nominal pressure. The accumulator (76) also is in communication with the supply line (46) by way of a branch line (101).

4 Claims, 1 Drawing Sheet

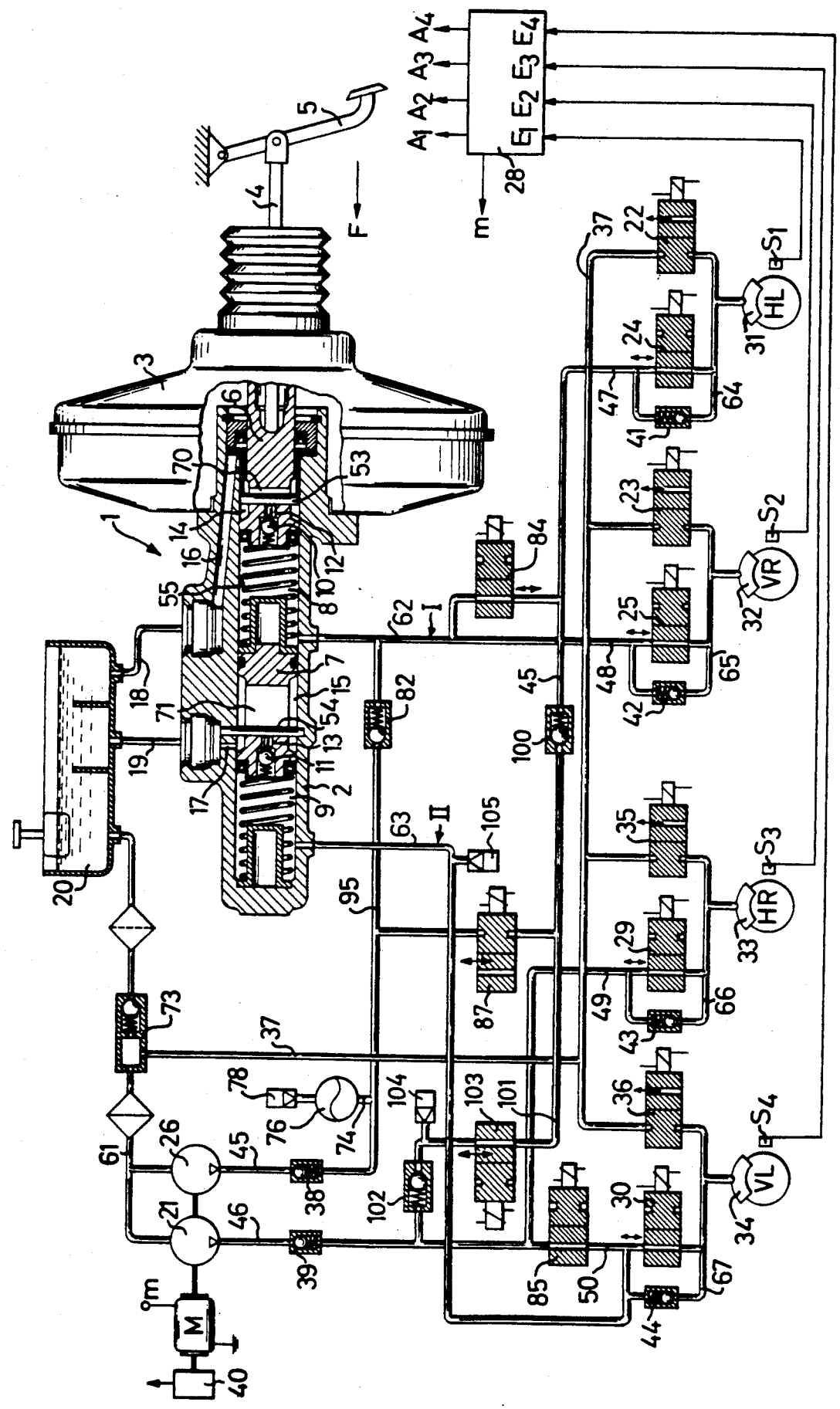

ANTI-LOCK BRAKE SYSTEM WITH TRACTION SLIP CONTROL

BACKGROUND OF THE INVENTION

The present invention relates to an anti-lock brake system with traction slip control comprising a pedal-actuated, auxiliary-force assisted braking pressure generator having a master cylinder with at least two chambers to which wheel brakes are connected by way of brake lines.

In known brake systems of this type (German published patent applications 30 40 561 and 30 40 562), a master cylinder with a hydraulic brake power booster connected upstream thereof is used as a braking pressure generator. The auxiliary-pressure supply system comprises a hydraulic pump and a hydraulic accumulator, out of which auxiliary pressure proportional to pedal force is introduced on brake application with the aid of a control valve. On the one hand, this dynamic pressure is transmitted by way of the master cylinder into the static brake circuits connected to the master cylinder. On the other hand, the wheel brakes of one axle, preferably those of the rear axle, are in direct communication with the pressure chamber into which the pressure proportional to pedal force is introduced through the control valve. For the purpose of slip control, moreover, inlet valves are inserted both into the static circuits and into the dynamic circuit which normally assume their open position and which, in the event of an imminent locked condition of a wheel, shut off the pressure-fluid flow to the wheel brake concerned.

Further, outlet valves are provided which allow discharge of the pressure fluid from the wheel brake to the pressure-compensating reservoir as needed. On commencement of slip control, the booster chamber in which the controlled pressure introduced out of the auxiliary-pressure supply system prevails is connected by way of a so-called main valve with the static brake circuits of the master cylinder in order to replenish the quantity of pressure fluid removed through the outlet valves into the static circuits.

In brake systems of this type, the control signals for the inlet valves and outlet valves are generated by electronic circuits, the inputs of which are connected with wheel sensors, for example, inductive transducer, and which thereby react on a variation of the wheel rotational behavior indicative of an imminent locked condition by maintaining the pressure at the relevant wheel constant, by reducing it and by re-increasing it anew.

Furthermore, a brake system is known from German published patent application 36 35 054, wherein each pump communicates by way of supply lines to the main brake lines. It has been found that the pumps are not in a position to deliver a sufficient amount of pressure fluid at the onset of a traction slip control action. Therefore, it is suggested in the above publication to arrange accumulators at the outlet of the pumps and to furnish the supply lines with shut-off valves which are opened in the event of a traction slip control action or brake slip control action. In the instance that driven wheels are allocated to both brake circuits, this known arrangement connects one accumulator to each supply line. This case occurs for instance when the vehicle is equipped with all-wheel drive or when the wheel brakes of diagonally opposite wheels form a brake circuit (diagonal allotment). It is recognized that the use of two hydraulic accumulators is costly and renders the brake system more expensive.

The present invention has as an object to devise an anti-lock brake system with traction slip control such that only one accumulator is employed, while, however, both brake circuits are simultaneously supplied with a sufficient pressure fluid.

SUMMARY OF THE INVENTION

Briefly, an anti-lock brake system with traction slip control comprising a pedal-actuated, auxiliary-force-assisted braking pressure generator having a master cylinder with at least two chambers is provided. Wheel brakes are connected to the master cylinder by way of main brake lines. Auxiliary-pressure hydraulic pumps are provided, and wheel sensors and electronic circuits are provided for determining the wheel rotational behavior and for generating electric braking-pressure control signals which, for the purpose of slip control, control electromagnetically actuatable pressure-fluid inlet valves and outlet valves. The main brake lines communicating by way of supply lines with driven pumps, whose suction ports are connected to the supply reservoir by way of a suction line. A valve is inserted into one of the supply lines by way of which pressure fluid is delivered into the connected main brake line for the purpose of traction slip control. The portion of the supply line (45, 46) interconnecting the pump (21, 26) and the valve (86, 87, 93) is connected with one of the chambers of the master cylinder by way of a bypass line (95, 96). A pressure-relief valve (82, 83) is interposed into the bypass line (95, 96) which permits the delivery of pressure fluid through the bypass line into the main brake line after a minimum pressure is exceeded but which precludes pressure fluid flow in opposite direction. A pressure-fluid accumulator is in communication with said bypass line, into which fluid is supplied by the pump until attainment of the minimum pressure, wherein branch lines branch off from the main supply line downstream of the valve and lead to the other supply lines, and wherein downstream of the branch point each non-return valve opening towards the main brake lines is inserted into the main supply line and into the branch lines.

BRIEF DESCRIPTION OF THE DRAWING

Further features, advantages and applications of the instant invention can be gathered from the following detailed description of an embodiment by way of the attached drawing in which the single figure is a simplified view, partially in cross-section, partially purely schematically, which illustrates the basic component parts of the three slip-controlled brake systems according to the present invention.

DETAILED DESCRIPTION

In the embodiment illustrated in the single figure, the brake system includes as a braking pressure generator 1 a hydraulic unit composed of a tandem master cylinder 2 and a vacuum booster 3 connected upstream thereof. By way of a push rod 4, the pedal force F applied on a brake pedal 5 is transmitted in a known fashion onto the vacuum booster 3 and boosted by auxiliary force, onto the working pistons 6 and 7 of the tandem master cylinder 2.

In the shown release position of the brake, the pressure chambers 8, 9 of the master cylinder 2 are in communication with a pressure-compensating and pressure-fluid supply reservoir 20 by way of open central control valves 10, 11, by way of connecting channels 12, 13 in the interior of the pistons 6, 7 and finally by way of annular chambers 14, 15, by way of connecting bores 16, 17 and by way of hydraulic lines 18, 19.

The two brake circuits I, II of the master cylinder 2 communicate with the wheel brakes 31, 32; 33, 34 by way of electromagnetically actuatable valves which are open in their initial position, that is so-called SO-valves (SO=open in their de-energized state) or inlet valves 24, 25 and 29, 30, respectively. The parallel connected wheel brakes 31, 32 and 33, 34, respectively, are allocated to the diagonals, as in a vehicle with rear-wheel drive. In case the brake system is applied to a vehicle with front-wheel drive, the wheel brakes are correspondingly exchanged.

The wheel brakes 31, 32, 33, 34 are further connected to electromagnetically actuatable outlet valves 22, 23 and 35, 36, respectively, so-called SG-valves (SG=closed in their de-energized state) which are closed in their inactive position and which, by way of a hydraulic return line 37, are in communication with the pressure-compensating reservoir 20, on the one hand, and, by way of the suction line 61, communicate with the suction sides of the pumps 21, 26. The pumps are hydraulic pumps driven electromotively (motor M). The electrical connections 'm' and 'Masse' (ground) are likewise illustrated symbolically. Additionally, there is provision for an electrically operating function-monitoring device, that is, a monitoring circuit 40, which checks the mode of operation of the motor M.

The vehicle wheels are equipped with indictive sensors $S_1$ to $S_4$ which cooperate with a toothed disc co-rotating synchronously to the wheel rotation and which generate electric signals indicative of the wheel rotational behavior, that means the wheel speed and variations thereof. These signals are fed by way of the inputs $E_1$ to $E_4$ to an electronic signal-processing and combining circuitry 28 which generates braking-pressure control signals which temporarily switch over the inlet and outlet valves 22, 23, 24, 25, 29, 30, 35, 36 on detection of an imminent locked condition and to thereby keep the braking pressure constant, to decrease it and to re-increase it at the appropriate time. To this end, the actuating magnets of the inlet and outlet valves are driven by way of the outputs $A_1$ to $A_4$. For clarity, the electric connecting lines between the ports $A_1$ to $A_4$ and the coils of the valves 22, 23, 24, 25, 29, 30, 35, 36 are not illustrated. The circuitry 28 can be realized in a known manner by conventional hard-wired circuits or by programmed electronic units, such as microcomputers or microcontrollers. The switch-on signal for the start-up of the drive motor M of the hydraulic pumps 21, 26 which must run during a slip control action is applied to the motor M by way of the connection m.

Inserted into the return line 37 or the suction line 61, respectively, is a brake-circuit protection valve 73 which is arranged as a non-return valves with intermediate reservoir and which allows replenishment supply of pressure fluid out of the pressure-fluid supply reservoir 20. The main brake lines 62, 63 are in communication with the outlet of the pump 21, 26 each by way of one supply line 45, 46. A pressure fluid accumulator 76 which is provided with a pressure-monitoring switch 78 connects to the outlet of the one pump (pump 26) by way of a branch line 74. Inserted further into the supply line 45 is a shut-off valve 87 which closes the supply line in its initial position. Moreover, a non-return valve 100 is arranged in the supply line 45.

In between the shut-off valve 87 and the non-return valve 100, a branch line 101 branches off which terminates into the supply line 46. The branch line 101 contains a second non-return valve 102. Additionally, the branch line 101 contains a valve which keeps the line open in its initial position and which closes the line in its switched position. A pressure switch 104 monitors the pressure between the two non-return valves 100 and 102. The supply lines 45 and 46 each terminate into a branch line of the main brake line 62, 63, to which the wheel brakes of the driven wheels 31, 33 are connected which can be uncoupled from the main brake line 61 and 63, respectively, by valves 84, 85. Another pressure switch 105 monitors the pressure in the main brake line 63.

The brake system in accordance with the present invention operates as follows: On brake application, the pedal force F boosted by the vacuum in the booster 3 is transmitted onto the master cylinder pistons 6, 7. The central control valves 10, 11 close, thus allowing braking pressure to develop in the pressure chambers 8, 9 and hence in the brake circuits I, II which propagates by way of the main brake lines 62, 63 and by way of the valves 24, 25 and 29, 30, respectively, to the wheel brakes 31, 32 and 33, 34 respectively, with the directional valves 84, 85 having assumed their opened position.

On detection of an imminent locked condition at one or more of the wheels by means of the sensors $S_1$ to $S_4$ and the circuitry 28, slip control will commence. The drive motor M of the pumps 21, 26 will be switched on, whereby pressure develops in the two supply lines 45, 46 which is applied to the wheel cylinders of the wheel brakes 31 to 34 by way of the non-return valves 38, 39 and the branch lines 47, 48 and 49, 50, respectively, and by way of the inlet valves 25, 26 and 29, 30, respectively, on the one hand, and which acts upon the pressure chambers 8, 9 of the master cylinder 2, on the other hand.

A signal of the circuitry 28 results in change-over of the electromagnetically actuatable inlet valves 24, 25 and 29, 30, respectively, and thus in closure of the brake circuits I, II and the branch lines 47 to 50, respectively. Further displacement of the master cylinder pistons 6, 7 in the direction of the pedal force F as well as emptying of the pressure chambers 8, 9 is precluded, since now the pressure fluid of the pumps 21, 26 flows into the pressure chambers 8, 9 urging the pistons 6, 7 back to their initial positions and, by way of the central control valves 10, 11, flows off into the reservoir 20. The actual braking pressure variation in the wheel brakes 31 to 34 is determined by the inlet and outlet valves 29, 30, 35, 36 which are furnished with further slip-controlling braking-pressure control signals by way of the lines $A_1$ to $A_4$.

As can be seen from the drawing, the inlet valves 24, 25 and 29, 30 respectively, in the bypass lines 64 to 67 are still protected by parallel connected non-return valves 41, 42 and 43, 44, respectively. In certain cases, these non-return valves 41, 42 permit termination of the braking pressure control and release of the wheel brakes, respectively, since a small quantity of pressure fluid can flow back from the wheel brakes 31 to 34 into the pressure chambers 8, 9, with the inlet valves 24, 25 and/or 29, 30 and the outlet valves 22, 23 and/or 35, 36 still closed, provided that the pistons 6, 7 of the master cylinder 2 have been returned to their initial position and the central control valves 10, 11 are in their opened position.

Each central control valve 10, 11 include a tappet which is slidably accommodated in a longitudinal bore of the piston 6, 7 and whose pedal-side end abuts on a stationary bolt 53, 54 which extends transversely through the piston bore 55 of the master cylinder 2 and which lifts the valve ball from its valve seat in the release position. To this end, the valve ball is held in a cage which encloses a rubber cushion or a plug made of any elastic material and which can be displaced in opposition to the force of a closure spring. In the valve position shown in the drawing, the pressure fluid can flow out of the pressure chamber 8 and 9, respectively, through an annular gap between valve ball and valve seat, through the longitudinal bore and the transverse groove into the annular chamber 14 and 15, respectively, and from there on through the channel 16 back into the pressure-fluid supply reservoir 20. As soon as the piston 6 is displaced by the pedal force F from its illustrated position in the direction of the arrow, the valve ball will take seat on the valve seat and thereby closes the associated longitudinal bore. Depending on the magnitude of the pedal force F, the central control valves 10, 11 may adopt a breathering position, with the pistons 6, 7 lifting at least partially from the cross members or bolts 53, 54, respectively.

When a traction slip control action is performed, the directional control valves 84, 85 (open in their de-energized state) will be closed, and the directional control valve 87 (closed in its de-energized state) will be switched to open so that pressure fluid is delivered out of the pressure-fluid accumulator 76 and/or by the simultaneously starting pumps 21, 26 into the two branch lines 47, 49 and enables slowing down of any one of the two vehicle wheels 31, 33 of the driven vehicle axle (HL, HR) or even of both vehicle wheels (depending upon the actuation of the two inlet valves 24, 29).

The pressure fluid flows out of the accumulator 76 by way of the open valve 87 as well as the non-return valve 100 into the branch line 47, and by way of the branch line 101 and the open valve 103 into the supply line 46 and from there further into the branch line 49. The introduction of pressure fluid into the non-driven wheel brake cylinders or into the master cylinder, respectively, is prevented by the closed valves 84, 85.

It will now be appreciated by those skilled in the art that in a simple fashion both brake circuits are supplied with fluid by means of one accumulator. It is the function of the non-return valves 100, 102 to separate the brake circuits from each other. This is because if one brake circuit fails, that is if the associated lines leak, pressure respectively is allowed to develop in the other brake circuit, since either the valve 100 or the valve 102 prevents that fluid flows into the defective brake circuit.

Should any one of the valves 100 or 102 no longer perform its function, pressure will be built up in the branch line 101 upon application of the brake, which pressure can be sensed by the pressure switch 104. In this event the valve 103 switches over and thus closes the branch line 101, whereby it is ensured that the two brake circuits are isolated hydraulically from each other. A traction slip control action is no longer possible, since pressure fluid out of the accumulator can no longer enter the brake circuit II. By virtue of an alarm lamp, the driver can be alerted to this condition so that repair may be initiated without delay.

Allocated to the pressure-fluid accumulator 76 is pressure-monitoring switch 78, which, upon the attainment of a minimum pressure or maximum pressure, issues signals to the signal-processing circuitry 28 which, in turn, correspondingly switches on or off the motor M of the pumps 21, 26. Pump 26 charges the accumulator, while pump 21 delivers fluid into an open-center system, that is, by way of the valve 85, the brake line 63 and the unpressurized master cylinder into the supply reservoir 20. When pressure develops in the brake lines due to depression of the pedal 5 which is sensed by a switch, the pump drive will be switched off instantaneously.

What is claimed is:

1. An anti-lock brake system with traction slip control comprising a pedal-actuated, auxiliary-force-assisted braking pressure generator having a master cylinder with at least two chambers, to which wheel brakes are connected by way of main brake lines, and having auxiliary-pressure hydraulic pumps, and wheel sensors and electronic circuits for determining the wheel rotational behavior and for generating electric braking-pressure control signals which, for the purpose of slip control, control electromagnetically actuatable pressure-fluid inlet valves and outlet valves, with the main brake lines communicating by way of supply lines with the pumps, whose suction ports are connected to a supply reservoir by way of a suction lines, a valve inserted into one of the supply lines by way of which pressure fluid is delivered into the connected main brake line for the purpose of traction slip control, wherein the portion of the supply line (45, 46) interconnecting the pump (21, 26) and the valve (86, 87, 93) is connected with one of the chambers of the master cylinder by way of a bypass line (95, 96), and wherein a pressure-relief valve (82, 83) is interposed into the bypass line (95, 96) which permits the delivery of pressure fluid through the bypass line into the main brake line after a minimum pressure is exceeded, but which precludes pressure fluid flow in opposite direction, and wherein a pressure-fluid accumulator is in communication with said bypass line, into which fluid is supplied by the pump until attainment of the minimum pressure, wherein branch lines branch off from a main supply line downstream of the valve and lead to other supply lines, and wherein downstream of the branch point one non-return valve opening towards the main brake lines is inserted into the main supply line and one non-return valve opening towards the main brake lines is inserted into the branch lines.

2. A brake system as claimed in claim 1, wherein one shut-off valve is inserted into each branch line.

3. A brake system as claimed in claim 1, wherein the pressure in the branch lines is monitored.

4. A brake system as claimed in claim 1, wherein the pressure is monitored in at least one of the chambers of the master brake cylinder.

* * * * *